(12) United States Patent
Berger et al.

(10) Patent No.: US 6,628,922 B1
(45) Date of Patent: Sep. 30, 2003

(54) COMMUNICATION SYSTEM UTILIZING MULTIPLE SATELLITES WITHOUT INTERSATELLITE CROSSLINKS

(76) Inventors: Harvey L. Berger, 1404 Green La., Redondo Beach, CA (US) 90278; Dennis A. Nivens, 321 Monterey Blvd., Hermosa Beach, CA (US) 90254; Reginald Jue, 2317 Elm Ave., Manhattan Beach, CA (US) 90266

(*) Notice: Subject to any disclaimer, the term of this patent is extended or adjusted under 35 U.S.C. 154(b) by 0 days.

(21) Appl. No.: 09/532,184

(22) Filed: Mar. 21, 2000

(51) Int. Cl.[7] ............................................. H04B 7/185
(52) U.S. Cl. ...................................... 455/13.1; 455/428
(58) Field of Search ................................. 455/427, 428, 455/429, 430, 12.1, 13.1, 13.2, 13.3, 16, 447, 454, 446; 370/316, 321, 327

(56) References Cited

U.S. PATENT DOCUMENTS

| | | | |
|---|---|---|---|
| 4,577,330 A | 3/1986 | Kavehrad | |
| 4,644,562 A | 2/1987 | Kavehrad et al. | |
| 5,758,261 A | * 5/1998 | Wiedeman | 455/13.1 |
| 5,995,832 A | * 11/1999 | Mallinckrodt | 455/427 |
| 6,147,981 A | * 11/2000 | Prescott | 370/318 |
| 6,249,514 B1 | * 6/2001 | Campanella | 370/316 |
| 6,272,317 B1 | 8/2001 | Houston et al. | |
| 6,396,819 B1 | * 5/2002 | Fleeter et al. | 370/320 |
| 6,400,925 B1 | 6/2002 | Tirabassi et al. | |
| 6,445,685 B1 | 9/2002 | Carrozza et al. | |

\* cited by examiner

*Primary Examiner*—Nay Maung
*Assistant Examiner*—Tanmay Lele

(57) ABSTRACT

A communications system includes two satellites located at the same node along the geostationary arc each capable of receiving RF signals through an uplink channel and transmitting RF signals through a downlink channel distinct from the uplink channels. At least two user terminals are in the system, with each user terminal able to transmit RF signals to only one of the satellites, but at least one of the user terminals is able to receive RF signals from both of the satellites.

7 Claims, 3 Drawing Sheets

COMMUNICATION SYSTEM UTILIZING MULTIPLE SATELLITES WITHOUT INTERSATELLITE CROSSLINKS

BACKGROUND OF THE INVENTION

This invention relates generally to satellite-based communication systems, and more particularly to a satellite-based communication system having multiple satellites without requiring satellite crosslinks.

Satellite-based communication systems which provide wireless access between separated user terminals on the earth are designed to give users of laptop PCs, handheld computer, and other similar devices very high-speed two-way data links with the Internet, their corporate Intranets, each other, and any other desired network. The service coverage is international, and utilizes high-power satellite transponders that route data from one user terminal to another.

The satellite-based systems presently under consideration include at least two different types of satellite constellations. One type, such as that described as the TELEDESIC™ or ICO Global systems, provides a plurality of satellites in low-earth or medium-earth orbits, in which satellites enter and exit from view of a user terminal and require handoffs from one satellite to another as the individual satellites traverse into and out of view of a particular user. These handoffs typically occur via intersatellite crosslinks which route incoming data from a user from one satellite to the next. These intersatellite crosslinks are expensive to manufacture, are heavy and thus increase launch costs, take up valuable real estate on the satellite, and consume precious power.

A second type of system, such as that known as ASTROLINK™, uses satellites in geostationary or geosynchronous orbit (GEO), which essentially is viewed as stationary in the sky by a user on the earth. Satellite handoffs are not necessary in the basic system, since only one satellite is ever in the field of view of the user.

However, in order to provide redundancy and to provide increased capacity, certain GEO systems may utilize two or more satellites in one node along the geostationary arc. This use of multiple satellites at one node can cause a problem, in that the ground terminals transmit and receive to and from only one satellite at a time. Communications between users accessing different satellites must be routed either on intersatellite crosslinks or through a ground-bounce gateway so that user data is routed to the satellite to which the user is connected. Users within a particular geographic region will be divided between the two satellites in the node. As a result, statistically, approximately half the data within a region will be routed between satellites. However, the ground-bounce gateway is an inefficient utilization of system resources. It therefore is desirable to have a system which can interconnect user terminals within a geographic region without requiring either intersatellite crosslinks or a double hop through a ground gateway.

SUMMARY OF THE INVENTION

In accordance with the present invention, the aforementioned need in the prior art is met by a communications system which includes two or more satellites each including means for receiving RF signals through an uplink channel and for transmitting RF signals through a downlink channel distinct from said first uplink channel. At least two user terminals are in the system, with each user terminal able to transmit RF signals to only one of the satellites, but both user terminals able to receive RF signals from both of the satellites.

An alternate embodiment also has two user terminals, but only one of the terminals has the capability to receive RF signals from both satellites. The other user terminal can receive signals from only one of the satellites. The first receiving satellite, in this instance, has the ability to determine the receiving capability of the second user terminal and, if the signal for this second terminal is one that the user terminal cannot receive directly, the satellite can route the signal through a ground gateway to the other satellite so that the transmission can be completed.

BRIEF DESCRIPTION OF THE DRAWINGS

Reference is now made to the Description of the Preferred Embodiments, illustrated in the accompanying drawings, in which.

DESCRIPTION OF THE PREFERRED EMBODIMENTS

Figure 1:
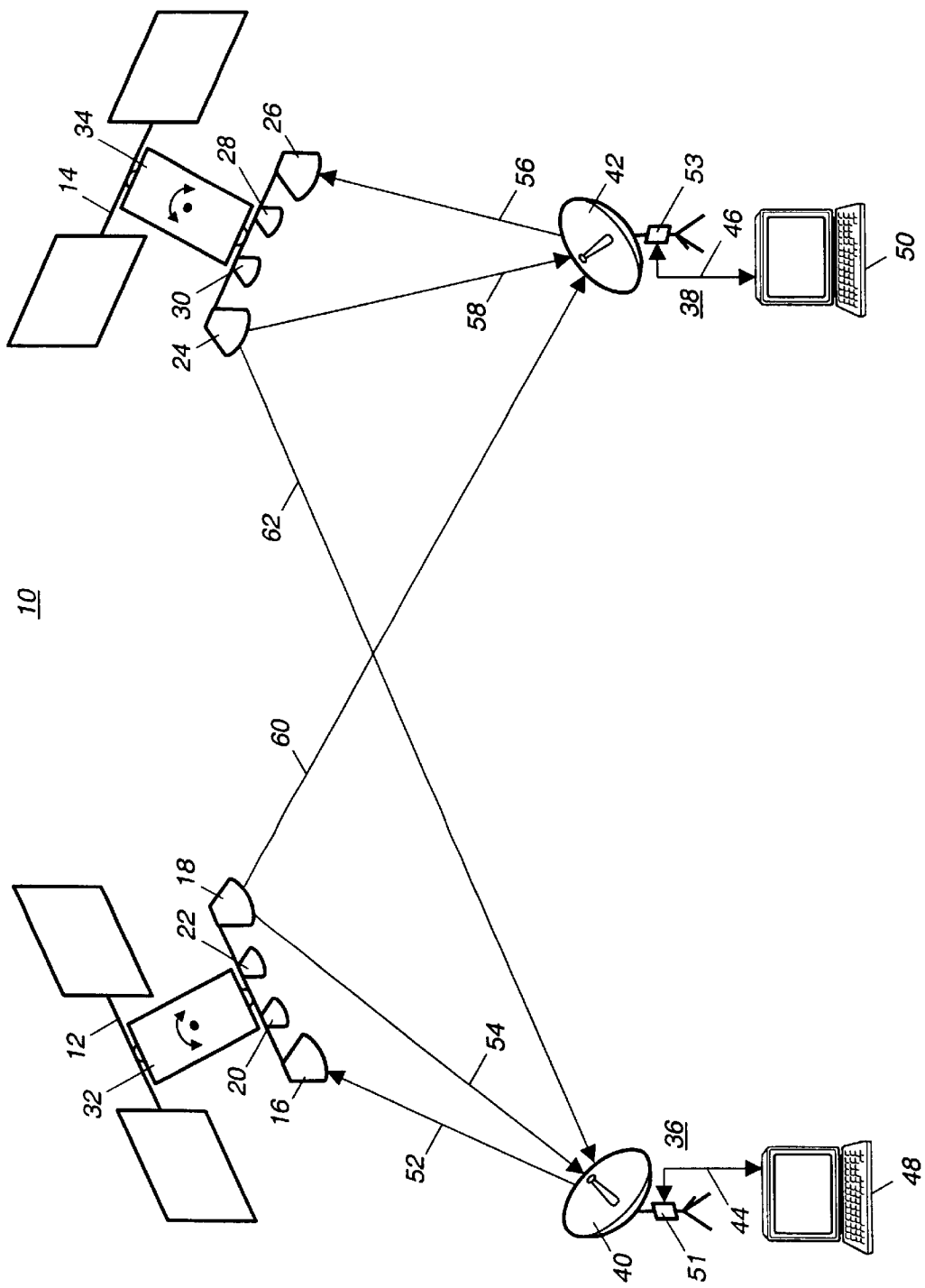
FIG. 1 is a schematic illustration of the principles of the present invention, showing the basic configuration of two satellites and two user terminals.

Referred now more particularly to FIG. 1, therein is shown a communications system 10 illustrating the principles of the invention. The system 10 includes a first orbiting satellite 12 and a second orbiting satellite 14. The satellites 12, 14 are preferably in geostationary orbit approximately 36,000 kilometers above the surface of the earth, and would be located in the same node along the geostationary arc. For example, both satellite could be located at 97° West longitude to provide coverage of the continental United States.

The satellite 12 includes four antennas: a user uplink antenna 16, a user downlink antenna 18, and gateway antennas 20, 22, whose function will be hereinafter described with reference to FIG. 2. The second satellite 14 also includes four antennas: the user uplink antenna 26, the user downlink antenna 24, and the two gateway antennas 28, 30.

Each satellite 12, 14 also includes a payload 32, 34 respectively, which routes incoming RF signals from the uplink antenna 16, 26 to the downlink antenna 18, 24 respectively. The payloads 32, 34 may also provide processing of the incoming RF signals if desired.

On the surface of the earth are two ground or user terminals 36, 38 separated from each other. Each terminal 36, 38 includes a combination transmit/receive antenna 40, 42 respectively which are connected, via the RF signal processors 51, 53 and the signal lines 44, 46 to the processing devices 48, 50, illustrated in the drawings as computer terminals though the invention is likewise applicable to all other device which can receive and process data. The antennas 40, 42 would be relatively small dishes, on the order of 18 inches in diameter.

The first user terminal 36 would normally be assigned to, and in RF communication with, the first satellite 12, and the second user terminal 38 would normally be assigned to, and in RF communication with, the second satellite 14. The first terminal 36 transmits RF signals to the satellite 12 over the uplink channel 52, and receives RF signals from the satellite 12 over the downlink channel 54. The second terminal 38 transmits RF signals to the satellite 14 over the uplink channel 56, and receives RF signals from the satellite 14 over the downlink channel 58.

In order to avoid interference, the uplink channel 52 for the first satellite 12 is distinct from the uplink channel 56 for the second satellite 14. The downlink channels 54, 58 are also different for the two satellites 12, 14 respectively. The distinctions can be brought about by having the channels at different frequencies or different polarizations, or both, so long as the combination of the uplink channel 52, the downlink channel 54, the uplink channel 56 and the downlink channel 58 operate at frequencies and polarizations selected to provide isolation between the channels. Additionally, the downlinks 54, 58 may be distinct by virtue of the satellite downlink antenna directional isolation and the user terminals 36, 38 geographical diversity, or by the use of antennas having multiple beams. For example, the uplink channel 52 could be carrying signals on a frequency of 29 GHz, the uplink channel 56 could be carrying signals on a frequency of 29.5 GHz, the downlink channel 54 could be carrying signals on a frequency of 19.5 GHz, and the downlink channel 58 could be carrying signals on a frequency of 20 GHz. Alternatively, the uplink channels 52, 56 could both be carrying signals at a frequency of 29.5 GHz, but with the channel 52 oriented with right hand circular polarization and the channel 56 oriented with left hand circular polarization, and both downlink channels 54, 58 could be carrying signals at a frequency of 29 GHz but with the channel 54 oriented with left hand circular polarization and channel 58 oriented with right hand circular polarization. Although not illustrated specifically in the figure, if the user terminals 36, 38 are located within different beam coverage areas of the two satellite antennas 18, 26 the downlink channels 54, 58 could be at the same frequency and polarization since the beam areas would not overlap and there would not be the necessity to utilize distinct channels.

If a plurality of user terminals 36 assigned to the same satellite 12 want to communicate with each other, the system routing is fairly simple. The RF signal, which in the preferred embodiment is a time division multiple access (TDMA) signal through other formats such as code division multiple access (CDMA) or frequency division multiple access (FDMA) may be used, is sent from the antenna 40 of one terminal 36 over the uplink channel 52 to the receiving antenna 16 of the satellite 12, where the payload 32 routes the signal to the downlink antenna 18 and over the downlink channel 54 to the antenna 40 of the recipient terminal 36. A similar routing can occur if the user terminals which want to communicate are terminals 38 assigned to the satellite 14.

The difficulty arises as a user terminal 36 assigned to satellite 12 desires to communicate with user terminal 38 assigned to satellite 14. In the prior art, such communication could occur only if the satellite 12, 14, had intersatellite crosslinks, or by using a double bounce down from the satellite 12 through a ground station, back up to the satellite 14, and then down to the user 38. This problem has been overcome by the present invention, in that the satellite, and more particularly the downlink antennas 18, 24, transmit their respective downlink RF signals in a beam which can be received by the terminals 36, 38 over dual channels. (For purposes of this description, signals are assumed to come out of only one beam of each antenna 18, 24. It is obvious, however, that the principles are applicable to multibeam antennas or phased array antennas, where the signals would be transmitted on a plurality of beams.) For example, the antenna 18 would transmit an RF signal in a beam out of the antenna 18 that would be viewed by the user terminals 36, 38 as two channels 54, 60 each having the same frequency and polarization. Likewise, satellite 14 antenna 24 would transmit its RF signals over a beam coming out of the antenna 24 that would be viewed by the user terminals as two channels 58, 62 each having the same characteristics of frequency and polarization. The user terminal 36 would have in its RF signal processor 51 appropriate circuitry (or programming) to enable the processor to receive RF signals over both channels 54 and 62, and user terminal 38 would have in its processor 53 appropriate circuitry (or programming) to enable the processor 50 to receive RF signals over both channels 58 and 60. In this fashion, signals intended for transmission from user terminal 36 to user terminal 38 can be directly accessed by user terminal 38 while the system avoids unnecessary delays and expense.

Figure 2:
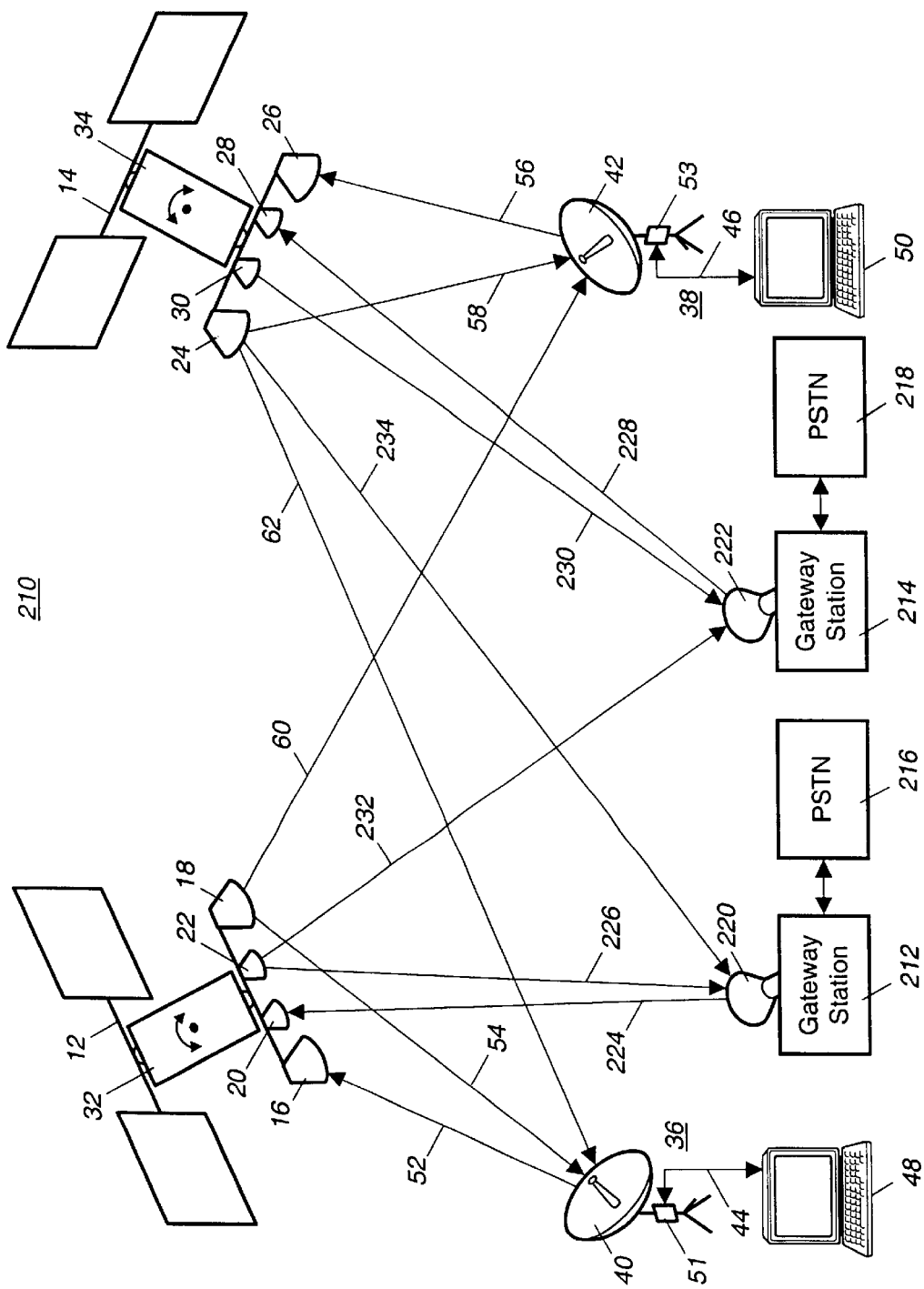
FIG. 2 is a schematic illustration of a more detailed implementation of the system of the present invention, including gateway stations which also communicate with the two satellites.

Referring now to FIG. 2, where like reference numerals refer to like items as illustrated in FIG. 1, there is illustrated a further expanded system 210 which includes additional capability to the system illustrated in FIG. 1. In FIG. 2, the system 210 includes two gateway stations 212, 214, each of which may have users associated therewith either through a public switched telephone network (PSTN) 216, 218, or otherwise. The gateway 212 has an antenna 220 connected thereto, and the gateway 214 has its antenna 222 connected thereto. The gateway 212 is assigned to, and communicates with, the satellite 12 through the uplink channel 224 to transmit signals to gateway antenna 20 on the satellite 12, and receives signals emanating from the antenna 22 via downlink channel 226. The gateway 214 is assigned to, and communicates with, the satellite 14 through the uplink channel 228 to transmit signals to gateway antenna 28 on the satellite 14, and receives signals emanating from the antenna 30 via downlink channel 230. As with the user direct channels 52, 54, 56, and 58, the gateway channels 224, 226, 228 and 230 are distinct from one another such as described previously. In a similar fashion as to the system described earlier, the gateway downlink antenna 22, in transmitting its RF signal in a beam, is viewed by the gateway stations 212, 214 as transmitting on two downlink channels 226, 232 having the same frequency and polarization characteristics. Further, gateway downlink antenna 30 transmits its outbound RF signals over a beam viewed by the two gateway stations 212, 214 as the two gateway downlink channels 230, 234 having the same polarization and frequency characteristics. In this manner, irrespective as to the satellite 12, 14 which is assigned to the originating or recipient user, the RF signal being communicated can be processed by the gateway 212, 214 without requiring either crosslinks or a double bounce. If desired, the functionality of the two gateways 212, 214 may be combined into one centrally located station having sufficient resources such as antennas, processing capability, etc.

Figure 3:
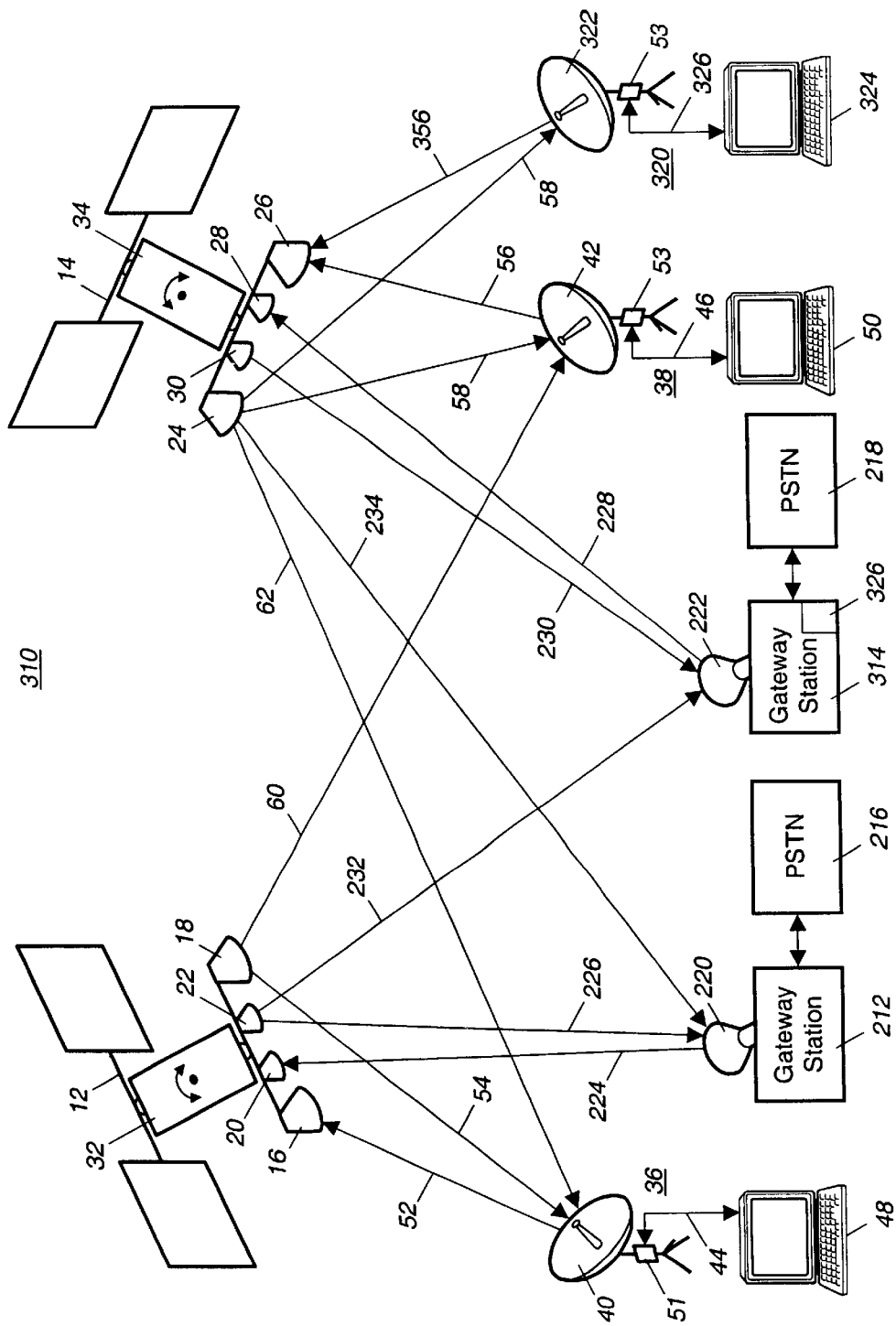
FIG. 3 is a schematic illustration of an alternate embodiment of the invention, in which one user terminal can receive downlink signals from only one of the satellites.

Referring now to FIG. 3, therein is shown a modification to the system 210 illustrated in FIG. 2, where the modified system 310 illustrates that not every user terminal needs to have dual receive capability. In this modification, the user terminal 320, with its antenna 322 connected by line 326 to the processor 324, uplinks to satellite 14 through uplink channel 56, and receives RF signals from the satellite 14 over the downlink channel 58, similar to that described with reference to user terminal 38. However, user terminal 320 is incapable of receiving RF signals from the satellite 12 over the downlink channel 60. Instead, communications from satellite 12 to user terminal 320 occur through gateway station 314.

The gateway 314 includes therein a database 326 or circuit setup information from a Network Operation Center (NOC) (not shown) which enables the gateway to determine the receiving capability of the user terminal 320 and transmit that information to the satellite 12. If a signal from satellite 12 is intended for user terminal 320, the satellite 12 transmits the signal to the gateway 222, which receives the signal via channel 232, and then routes the received signal to the satellite 14 over channel 228 so that the satellite 14 can further transmit the signal over channel 58 to the terminal 320. Though this suffers from the same double bounce as is present in the prior art, the overall system 310 efficiency has been improved because only those terminals 320 which do not contain the ability to receive the dual signals are even subject to the possibility of requiring a double bounce.

Therefore, it can be seen that the present invention provides a more efficient, robust communication system that permits the siting of two satellites at the same node along the geostationary arc without requiring the inclusion of inter-satellite crosslinks or the inherent delays involved with a double bounce.

We claim:

1. A communications system comprising:
   a first satellite in geostationary earth orbit (GEO), including means for receiving RF signals through a first uplink channel and for transmitting RF signals through a first downlink channel distinct from said first uplink channel;
   a second satellite in geostationary earth orbit (GEO), including means for receiving RF signals through a second uplink channel distinct from said first uplink channel, and for transmitting RF signals through a second downlink channel distinct from said first downlink channel and said second uplink channel;
   a first user terminal in RF communication with said first satellite, said first user terminal transmitting RF signals to said first satellite through said first uplink channel and receiving RF signals from said first satellite through said first downlink channel, said first user terminal further including means for receiving RF signals from said second satellite through said second downlink channel; and
   a second user terminal in RF communication with said first satellite, said second user terminal transmitting RF signals to said second satellite through said second uplink channel and receiving RF signals from said first satellite through said second downlink channel, said second user terminal further including means for receiving RF signals from said first satellite through said second downlink channel;
   wherein the term distinct means non-interfering and different with respect to at least one of the properties of frequency and polarization of the RF signals.

2. The communications system according to claim 1 including a third user terminal in RF communication with said second satellite, said third user terminal transmitting RF signals to said second satellite through said second uplink channel and receiving RF signals from said second satellite through said second downlink channel, said third user terminal incapable of receiving RF signals from said first satellite through said first downlink channel.

3. The communications system according to claim 1 wherein said first uplink channel operates at a first frequency, said second uplink channel operates at a second frequency, said first downlink channel operates at a third frequency, and said second downlink channel operates at a fourth frequency.

4. The communications system according to claim 1 wherein said first uplink channel operates at a first polarization, said second uplink channel operates at a second polarization, said first downlink channel operates at a third polarization, and said second downlink channel operates at a fourth polarization.

5. The communications system according to claim 1 wherein said RF signals are time division multiple access signals.

6. A communications system comprising:
   a first satellite in geosynchronous earth orbit (GEO), including means for receiving RF signals through a first uplink channel and for transmitting RF signals through a first downlink channel distinct from said first uplink channel;
   a second satellite in geosynchronous earth orbit (GEO), including means for receiving RF signals through a second uplink channel district from said first uplink channel, and for transmitting RF signals through a second downlink channel distinct from said first downlink channel and said second uplink channel;
   a first user terminal in RF communication with said first satellite, said first user terminal transmitting RF signals to said first satellite through said first uplink channel and receiving RF signals from said first satellite through said first downlink channel, said first user terminal further including means for receiving RF signals from said second satelite through said second downlink channel; and
   a second user terminal in RF communication with said second satellite, said second user terminal transmitting RF signals to said second satellite through said second uplink channel and receiving RF signals from said second satellite through said second downlink channel, said second user terminal incapable of receiving RF signals from said first satellite through said first downlink channel;
   wherein the term distinct means non-interfering and different with respect to at least one of the properties of frequency and polarization of the RF signals;
   and wherein the system further comprises a gateway station in RF communication with said first satellite, and said second satellite, said gateway station including means for determining the receiving capability of said second user terminal, and means for routing RF signals received from said first satellite through said first downlink channel to said second user terminal through said second satellite.

7. The communication system according to claim 6 further including means located on the first satellite for receiving information concerning the receiving capability of said second user terminal and for transmitting the RF signals to said gateway station based on the capability of the second user terminal to receive RF signals from said first satellite.

* * * * *